United States Patent
Lee et al.

(10) Patent No.: US 11,659,370 B2
(45) Date of Patent: May 23, 2023

(54) OVER-THE-AIR UPDATE APPARATUS IN VEHICLE AND METHOD THEREOF

(71) Applicants: Hyundai Motor Company, Seoul (KR); Kia Motors Corporation, Seoul (KR)

(72) Inventors: Hee Jun Lee, Seoul (KR); Sun Woo Kim, Seoul (KR); Myeong Gyu Jeong, Seoul (KR); Dong Youl Lee, Seoul (KR); Won Ho Shin, Seoul (KR); Hyeok Sang Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 108 days.

(21) Appl. No.: 17/021,786

(22) Filed: Sep. 15, 2020

(65) Prior Publication Data
US 2021/0345076 A1  Nov. 4, 2021

(30) Foreign Application Priority Data
Apr. 29, 2020  (KR) .................... 10-2020-0052401

(51) Int. Cl.
*H04W 4/44*  (2018.01)
*H04W 52/02*  (2009.01)
*G06F 8/65*  (2018.01)
*H04W 92/10*  (2009.01)

(52) U.S. Cl.
CPC ............... *H04W 4/44* (2018.02); *G06F 8/65* (2013.01); *H04W 52/0261* (2013.01); *H04W 92/10* (2013.01)

(58) Field of Classification Search
None
See application file for complete search history.

(56) References Cited

U.S. PATENT DOCUMENTS

| | | | |
|---|---|---|---|
| 10,891,123 B2 * | 1/2021 | Kiyama | H04W 4/44 |
| 2013/0029595 A1 * | 1/2013 | Widmer | B60L 53/124 |
| | | | 455/39 |
| 2014/0132210 A1 * | 5/2014 | Partovi | H02J 50/90 |
| | | | 320/108 |
| 2015/0358955 A1 * | 12/2015 | Kresse | H04L 67/12 |
| | | | 370/329 |
| 2016/0077827 A1 * | 3/2016 | Throop | B60L 58/13 |
| | | | 717/168 |
| 2017/0212746 A1 * | 7/2017 | Quin | H04L 63/123 |
| 2018/0276427 A1 * | 9/2018 | Depew | G06K 7/0095 |
| 2019/0020210 A1 * | 1/2019 | Partovi | H02J 7/00032 |
| 2019/0050217 A1 * | 2/2019 | Tatourian | G06F 8/65 |

(Continued)

FOREIGN PATENT DOCUMENTS

WO  WO-2010051858 A1 * 5/2010 ............. H04H 20/16

*Primary Examiner* — Nicholas Sloms
(74) *Attorney, Agent, or Firm* — Fox Rothschild LLP

(57) ABSTRACT

An over-the-air update apparatus in a vehicle and a method thereof are provided. The over-the-air update apparatus in the vehicle includes a communication device that receives data for an over-the-air (OTA) update of vehicle software from an external server and a processor that determines a priority for the over-the-air update based on a current consumption and a data processing speed with respect to each of a plurality of controllers. The processor allows data to be selectively transmitted based on the determined priority.

16 Claims, 6 Drawing Sheets

(56) References Cited

U.S. PATENT DOCUMENTS

| | | | |
|---|---|---|---|
| 2019/0205115 A1* | 7/2019 | Gomes | H04W 4/50 |
| 2019/0235855 A1* | 8/2019 | Nakano | H04B 7/14 |
| 2019/0258467 A1* | 8/2019 | Frantz | G01C 21/3691 |
| 2019/0268420 A1* | 8/2019 | Acharya | G06F 8/658 |
| 2019/0379763 A1* | 12/2019 | Wirtanen | H04W 4/14 |
| 2020/0050378 A1* | 2/2020 | Sakurai | G06F 8/65 |
| 2020/0133812 A1* | 4/2020 | Ogawa | G06F 8/65 |
| 2021/0224056 A1* | 7/2021 | John | G06F 8/65 |
| 2021/0256842 A1* | 8/2021 | Zhang | G08G 1/0112 |

\* cited by examiner

OVER-THE-AIR UPDATE APPARATUS IN VEHICLE AND METHOD THEREOF

CROSS-REFERENCE TO RELATED APPLICATION

This application claims the benefit of priority to Korean Patent Application No. 10-2020-0052401, filed on Apr. 29, 2020, the entire contents of which are incorporated herein by reference.

TECHNICAL FIELD

The present disclosure relates to an over-the-air update apparatus in a vehicle and a method thereof, and more particularly, to an over-the-air update technique in a vehicle, which determines a priority for at least one or more controllers and performs an update of firmware data based on the determined priority.

BACKGROUND

As intelligent transportation system (ITS) develops and vehicles capable of wireless communication (e.g., Wi-Fi, 3G, LTE, 5G, NR (New Radio) systems, or the like) increase, communication between vehicles or between the vehicle and an external infrastructure is gradually developing into various service types. In addition, the number of electronic control units (ECUs) within the vehicle is increasing due to consumer service demands and additional functions. As structures and functions of these electronic controllers are increasingly diversified and complex, due to bug fix, performance improvement, security improvement, or the like with respect to the electronic controllers, updating software in the vehicle is required more frequently. Accordingly, there is a need for an over-the-air update technique in a vehicle, which is more efficient and ensures stability.

SUMMARY

An aspect of the present disclosure provides an over-the-air update apparatus in a vehicle and a method thereof that perform an update of firmware data based on a priority. Another aspect of the present disclosure provides an over-the-air update apparatus in a vehicle and a method thereof that perform an update of firmware data based on a current consumption for each controller.

Another aspect of the present disclosure provides an over-the-air update apparatus in a vehicle and a method thereof that perform an update of firmware data based on a data processing speed for each controller. Another aspect of the present disclosure provides an over-the-air update apparatus in a vehicle and a method thereof that perform an update of firmware data based on an amount of data for each controller.

Another aspect of the present disclosure provides an over-the-air update apparatus in a vehicle and a method thereof that perform an update of firmware data based on a duplication state for each controller. Another aspect of the present disclosure provides an over-the-air update apparatus in a vehicle and a method thereof that perform an update of firmware data based on essential flag information for each controller.

Another aspect of the present disclosure provides an over-the-air update apparatus in a vehicle and a method thereof that perform an update of firmware data by setting a priority in an order of a controller having a small current consumption. Another aspect of the present disclosure provides an over-the-air update apparatus in a vehicle and a method thereof that selectively perform an update of firmware data based on an importance of a user service.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an over-the-air update apparatus in a vehicle may include a communication device configured to data for an over-the-air (OTA) update of vehicle software from an external server, and a processor configured to determine a priority for the over-the-air update based on a current consumption and a data processing speed with respect to each controller, and allows the data to be selectively transmitted based on the determined priority. In an exemplary embodiment, the processor may be configured to predict the current consumption with respect to the each controller for the over-the-air update based on the current consumption and the data processing speed with respect to the each controller.

The processor may be configured to identify a battery status of the vehicle and determine the priority for the over-the-air update when the battery status is a low power status, and allow the data to be selectively transmitted based on the determined priority. In addition, the processor may be configured to determine the priority for the over-the-air update based on at least one of information about an amount of data, information regarding whether to duplicate, or information regarding essential flags with respect to the each controller. The processor may be configured to predict the current consumption with respect to the each controller for the over-the-air update based on information regarding an amount of data with respect to the each controller.

Further, the processor may be configured to identify the current consumption with respect to the each controller, and determine the priority such that the priority for the over-the-air update is high in an order of a controller having a small current consumption. The processor may be configured to identify the information regarding whether to duplicate with respect to the each controller, and determine the priority such that the priority for the over-the-air update is high a controller including the information regarding whether to duplicate than a controller not including the information regarding whether to duplicate. In an exemplary embodiment, the processor may be configured to identify the information regarding the essential flags with respect to the each controller, and determine the priority such that the priority for the over-the-air update is high in an order of a controller including the information regarding the essential flags.

The over-the-air update apparatus in the vehicle may include an OTA controller including OTA management logic that include a communication device configured to wirelessly download the data from the server, and a processor that allows the data to be selectively transmitted based on the determined priority, and a performance controller including OTA performance logic configured to perform a firmware update by receiving data selectively transmitted from the OTA controller. The performance controller may include a transceiver and may be configured to receive the data that is selectively transmitted. In an exemplary embodiment, the communication device may include at least one of a mobile communication unit, a broadcast communication unit, a short-range communication unit, and a Wi-Fi communication unit for the over-the-air update, or wherein the mobile communication unit may support at least one of a 3G system, an LTE system, a 5G system, or an NR (New Radio) system.

According to an aspect of the present disclosure, an over-the-air update method in a vehicle may include receiving data for an over-the-air (OTA) update of vehicle software from an external server, determining a priority for the over-the-air update based on a current consumption and a data processing speed with respect to each controller, and allowing the data to be selectively transmitted based on the determined priority. In an exemplary embodiment, the determining of the priority may include predicting the current consumption with respect to the each controller for the over-the-air update based on the current consumption and the data processing speed with respect to the each controller.

In an exemplary embodiment, the determining of the priority may include identifying a battery status of the vehicle, and applying the priority for the over-the-air update when the battery status of the vehicle is a low power status. In addition, the determining of the priority may include determining the priority for the over-the-air update based on at least one of information regarding an amount of data, information regarding whether to duplicate, or information regarding essential flags with respect to the each controller.

The determining of the priority may include predicting the current consumption with respect to the each controller for the over-the-air update based on information regarding an amount of data with respect to the each controller. In addition, the determining of the priority may include identifying the current consumption with respect to the each controller, and determining the priority such that the priority for the over-the-air update is high in an order of a controller having a small current consumption.

In an exemplary embodiment, the determining of the priority may include identifying the information about whether to duplicate with respect to the each controller, and determining the priority such that the priority for the over-the-air update is high a controller including the information regarding whether to duplicate than a controller not including the information regarding whether to duplicate. The determining of the priority may include identifying the information regarding the essential flags with respect to the each controller, and determining the priority such that the priority for the over-the-air update is high in an order of a controller including the information regarding the essential flags.

In an exemplary embodiment, the over-the-air update method may further include wirelessly downloading the data from the server, allowing the data to be selectively transmitted based on the determined priority, and receiving the selectively transmitted data to perform a firmware update. In addition, the wirelessly downloading may be performed through at least one of a mobile communication unit, a broadcast communication unit, a short-range communication unit, or a Wi-Fi communication unit, and wherein the mobile communication unit may support at least one of a 3G system, an LTE system, a 5G system, or an NR system.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
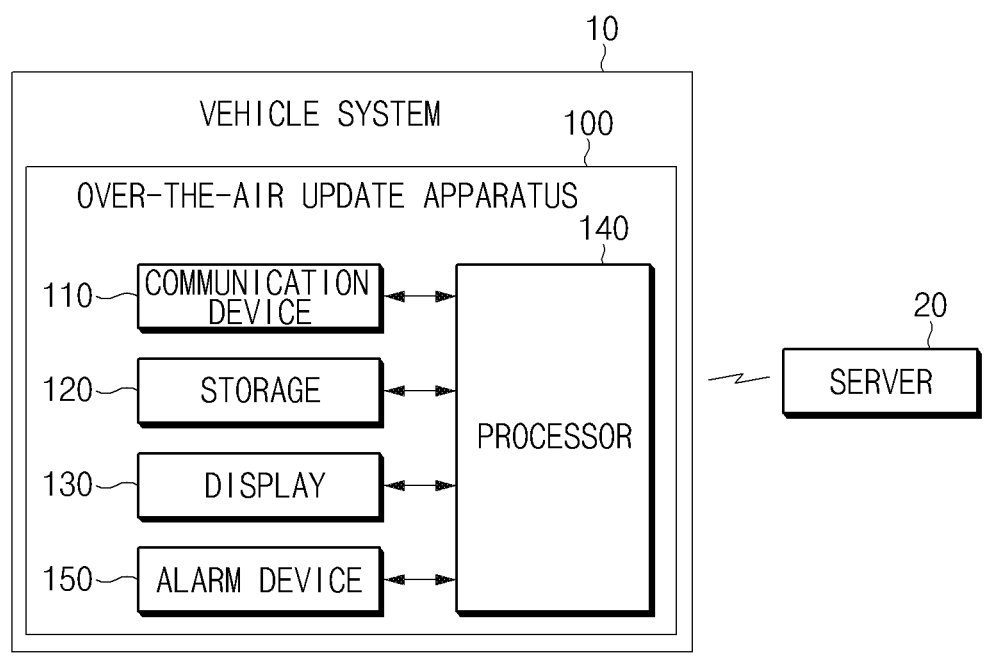
FIG. 1 is a block diagram illustrating a configuration of a vehicle system including an over-the-air update apparatus in a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses an OTA (Over-The-Air) management/performance controller that performs a software update during remote reprogramming in an over-the-air update system in a vehicle, which may include various service controllers according to a user's service request. In particular, a 3G system, an LTE system, a 5G system, an NR (New Radio) system, or an advanced communication system (network) may be used as a development of wireless communication technology, or as more and more data may be transmitted and received in a specific communication area such as a Wi-Fi communication, services that transmits and receives more various types of firmware data may be included.

In addition, as a vehicle remote control or an IoT technology using a smart phone is grafted, and an Internet technology is grafted to the vehicle, various service data for infotainment systems such as a navigation may be updated in the vehicle through the Internet. In addition, as an autonomous driving capability develops, a scope of the over-the-air update will gradually expand. Therefore, a concept with more secure and efficient OTA performance will be proposed.

Hereinafter, exemplary embodiments of the present disclosure will be described in detail with reference to FIGS. 1 to 6. FIG. 1 is a block diagram illustrating a configuration of a vehicle system 10 including an over-the-air update apparatus in a vehicle according to an exemplary embodiment of the present disclosure. Referring to FIG. 1, an over-the-air update apparatus 100 in a vehicle according to an exemplary embodiment of the present disclosure may be configured to perform a background transfer of data for an over-the-air update of software of the vehicle from a server 20 outside the vehicle. The over-the-air update apparatus 100 in the vehicle may be configured to execute the background transfer for the over-the-air update, based on at least one or more of a network load, a vehicle power status, a battery status, and an estimated time to transmit remaining ROM data.

In particular, the over-the-air update apparatus 100 in the vehicle according to the present disclosure may include predicting a current consumption for each controller when the OTA (Over-The-Air) update is performed, and determining a priority to perform an optimized OTA update based on a limited battery status. Particularly, the over-the-air update apparatus 100 according to the present disclosure may preferentially update a selected service according to a user's request based on a performance of a communication module, a processing speed of each controller, and an amount of data. In addition, after the OTA update is successful, the over-the-air update apparatus 100 may be configured to read a SW version, identify a completion of normal reprogramming, and report and provide the identification result to the user.

A service according to the present disclosure may include, for example, an autonomous driving service, an automobile remote control service, an interactive service such as a game, a large-capacity short-range audio/video service such as an AR or a VR, or the like. In addition, updates associated with vehicle infotainment software or map information may be present in the service. Further, a service such as server-based voice recognition, smart watch interworking, a home-to-car service, or the like may exist in the service.

Particularly, the home-to-car service may include, for example, a home lighting control, an air conditioning control, plug control functions in such as a laundry room/living room/bedroom through a communication ECU in the vehicle. Alternatively, a vehicle diagnostic control service may exist in the service. For example, a service may be provided, such as identifying a location of a nearby workshop and sharing vehicle information with the workshop, and making maintenance reservation to a workshop selected by a user. Accordingly, maintenance visits may be scheduled by allowing vehicle information to be provided to more workshops such that workshops may learn more about the vehicle. For example, maintenance requirements, a time elapsed since the last maintenance, functional status information, and diagnostic information of the vehicle may be transmitted based on information such as when the vehicle was last operated, as vehicle information.

As described, according to user service requirements and in-vehicle communication and technology development, the performance of the over-the-air update apparatus 100 in the vehicle may be recognized as an important service factor when a vehicle is purchased. In particular, in the case of a vehicle, there are many situations to consider in terms of securing a stability such as a battery discharge and a communication network failure to stably download large-capacity data in a driving situation. Therefore, maintaining stability and security when the OTA is updated is as important as the user's service requirements.

The over-the-air update apparatus 100 in the vehicle may include a communication device 110, storage 120, a display 130, a processor 140, and an alarm device 150. The communication device 110 may be a hardware device implemented with various electronic circuits to transmit and receive a signal through a wireless or wired connection, and the communication device 110 in the present disclosure may be configured to perform an in-vehicle communication via a controller area network (CAN) communication, a LIN communication, an Ethernet communication, or the like. The communication device 110 may include various communication units such as a mobile communication unit for communication with the server 20 outside the vehicle, a broadcast receiving unit such as a DMB module or a DVB-H module, a short-range communication unit such as a Bluetooth module, a Zigbee module, or an NFC module, a Wi-Fi communication unit, or the like. In particular, the CAN (Controller Area Network) communication is a vehicle network system that is developed to provide digital serial communication among various measurement control equipment in a vehicle, and a CAN-data bus is used for data transmission and control among ECUs.

The communication device 110 according to the present disclosure may be mounted within the vehicle or may be configured in a form in which a wireless communication terminal is in contact, and may be configured to perform an inter-vehicle communication and an infrastructure communication between vehicles. The autonomous driving may be performed to a specified destination via a vehicle sensor and a driving control function provided in the vehicle. Particularly, the vehicle sensor may include at least one of a global positioning system (GPS) sensor, a gyro sensor, and an acceleration sensor. The communication device 110 according to an example of the present disclosure may support a WAVE communication technology or a communication technology of a 3GPP-based LTE/NR system. For reference, the WAVE (Wireless Access for Vehicle Environment) communication is a technology that modifies the technology of IEEE 802.11a wireless LAN, uses a dedicated 5.9 GHz band, has a channel frequency bandwidth of 10 MHz, a maximum data rate of 27 Mbps, a wireless channel access of a CSMA/CA manner, and a feature composed of an IEEE 802.11p physical layer and a 1609 communication stack. Meanwhile, when the 3GPP system is supported, the communication device 110 may include the communication technology of LTE eV2X and 5G V2X, based on LTE V2X (Rel. 14).

In particular, the vehicle according to the present disclosure may support a V2V (vehicle-to-vehicle) that refers to an LTE/NR-based communication between vehicles, a V2P (vehicle-to-pedestrian) that refers to the LTE/NR-based communication between the vehicle and a terminal carried by an individual, and a V2I/N (vehicle-to-infrastructure/network) that refers to LTE/NR-based communication between the vehicle and a roadside unit/network. Accordingly, a network scalability may be improved by a communication through a mobile communication system. A cell coverage through the network system may be extended. In addition, there are no limitations about multiple access techniques of a wireless communication system to which the present disclosure is applied.

For example, various multiple access techniques such as a Code Division Multiple Access (CDMA), a Time Division Multiple Access (TDMA), a Frequency Division Multiple Access (FDMA), an Orthogonal Frequency Division Multiple Access (OFDMA), a Single Carrier-FDMA (SC-FDMA), an OFDM-FDMA, an OFDM-TDMA, and an OFDM-CDMA may be used. In addition, a time division duplex (TDD) method that transmits using different times or a frequency division duplex (FDD) method that transmits using different frequencies may be used for an uplink transmission and a downlink transmission.

The storage 120 may be configured to store data that are downloaded for the over-the-air update in the vehicle and received from the server 20 via the communication device 110. Accordingly, the storage 120 may be configured to store/manage/update status/diagnosis information of a subject vehicle, location information, road information, road surrounding information such as a bus stop, and information regarding road environment through vehicle sensors provided in the vehicle and the server 20. In addition, the storage 120 may be configured to store destination information set by a user, existing searched route information, and the like. Alternatively, the storage 120 may be configured to store/manage data of various input sensors for supporting autonomous driving and data through the server 20 supporting the road information, communication information, and the like.

In addition, the storage 120 may be configured to store at least one or more of the network load, a power status of the vehicle, a battery status, and the estimated time to transmit the remaining ROM data, which are determined by the processor 140. In particular, the storage 120 may be configured to store instructions for each function. The storage 120 may include may include at least one type of storage medium of a memory that has memory types such as a flash memory type, a hard disk type, a micro type, and a card type (e.g., an SD (Secure Digital) card or an XD (eXtream Digital) card), or the like and a memory that has memory types such as a random access memory (RAM), a static RAM (SRAM), a read-only Memory (ROM), a programmable ROM (PROM), an electrically erasable PROM (EEPROM), a magnetic RAM (MRAM), a magnetic disk, and optical disk.

The display 130 may be configured to display a screen for receiving user authentication associated with the over-the-air update in the vehicle under control of the processor 140. The display 130 may be implemented as a head-up display (HUD), a cluster, an AVN (audio video navigation), or the like. In addition, the display 130 may include at least one of a liquid crystal display (LCD), a thin film transistor liquid crystal display (TFT LCD), a light emitting diode (LED) display, an organic light emitting diode (OLED) display, an active OLED (AMOLED, Active Matrix OLED) display, a flexible display, a bended display, and a three-dimensional display (3D display). Some of the displays described above may be implemented as a transparent display configured to be transparent or translucent such that the user may see an outside. In addition, the display 130 may be provided as a touch screen including a touch panel and may be used as the input device in addition to an output device. According to the present disclosure, the display 130 may be configured to display reprogramming completion and version information to the user.

The processor 140 may be electrically connected to the communication device 110, the storage 120, the display 130, the alarm device 150, and the like, and may be configured to electrically operate each component. The processor 140 may be an electrical circuit that executes instructions from software, whereby various data processing and calculations described later may be performed. The processor 140 may be configured to determine whether to perform the over-the-air update based on the network load, the power status of the vehicle, the battery status, and the estimated time to transmit the remaining ROM data. In particular, according to an example of the present disclosure, the processor 140 may be configured to identify the current consumption of the controller implemented in response to each service in the vehicle, and allows the optimal OTA update to be performed based on the current consumption/the data processing speed for each controller.

The processor 140 allows the over-the-air update to be selective and reliable, by predicting the current consumption for each controller based on the amount of the OTA data and the processing speed and setting the priority. The processor 140 according to the present disclosure may be connected to an external device, based on a Global Positioning System (GPS), telematics, a Bluetooth, a USB, the Wi-Fi, the WAVE, and an LTE/5G communication system, and may be configured to perform communication processing for entertainment service and a firmware update, a remote starting, an eCall, and the autonomous driving service.

The processor 140 may be configured to determine whether a vehicle mode for the over-the-air update is a download mode or an update mode, and in response to determining that the vehicle mode is the download mode, the processor 140 may be configured to determine whether the vehicle is in a driving status. The processor 140 may be configured to determine whether the network load of the vehicle is greater than a threshold when the vehicle is in an ignition off status. In response to determining that the network load of the vehicle is greater than the threshold, the processor 140 may be configured to set a time interval between successive frames to be substantial and a unit transmission size to be small. When the network load of the vehicle is less than or equal to the threshold, the processor 140 may be configured to set the time interval between the successive frames to be small and the unit transmission size to be large. The processor 140 may be configured to perform the background transfer based on the network load of the vehicle, and determine a vehicle status when the background transfer is completed.

The processor 140 may be configured to complete the background transfer when the vehicle status is the ignition off status. In response to determining that the vehicle status is an ignition-on status, the processor 140 may be configured to perform the over-the-air update with approval from the user with respect to performance of the over-the-air update when the vehicle status is transitioned to ignition off status. In response to determining that the vehicle status is an ignition-on status, the processor 140 may be configured to calculate the estimated time to transmit the remaining ROM data, and determine whether a current battery status is capable of the background transfer during the estimated time to transmit the remaining ROM data. The processor 140 may be configured to determine the network load when the background transfer is possible. The processor 140 may be configured to continue to perform the background transfer even if the power status of the vehicle transitions.

In addition, the processor 140 according to the present disclosure includes functions of a default (normal)/differential/memory duplication/the differential+memory duplication, and includes performing the OTA update for each set function. The diagnostic instructions newly added for performing the OTA update according to the present disclosure are as follows.

ⓐ ReadActiveArea: an instruction to read the current active (boot) memory area of A/B memories, ⓑ EraseTargetArea an instruction to erase one of A/B memories [Except for non-NOR flash]. This is an instruction that may be applied in the form of erasing memory that is not currently being operated in the OTA update, ⓒ CopyActiveAreaTo: an instruction to copy memory contents from A→B or B→A. In the OTA update, an instruction to copy the memory contents of the currently operating area to a non-working memory, and ⓓ WriteDeltaPatch: an instruction to allow a ROM to be created inside the controller based on a Delta, not an actual ROM transfer.

When a screen for receiving approval from the user is displayed on the display 130, the alarm device 150 may be configured to output an alarm for approval to the user. As described above, the present disclosure supports update enhancement through the instructions corresponding to each function when the OVA update is performed in the vehicle, and ensures a continuity in transmission by supporting a background update during corresponding functions.

Meanwhile, remote reprogramming of vehicle controller software may be performed while the vehicle is stopped. A time when the vehicle is stopped is flexible, a charge amount of the battery is limited, and the current consumption for each controller and an update amount for each situation are different. Thus, when downloading and transmitting firmware for an update are performed regardless of the priority, it is impossible to perform the optimized OTA update in the status where the battery is low power. Therefore, the present disclosure may perform optimization of battery usage calculation based on the amount of data required for the OTA update and a power consumption required, and may provide optimized OTA update performance for battery usage by starting the OTA update from the controller that is expected to have the lowest current consumption.

Figure 2:
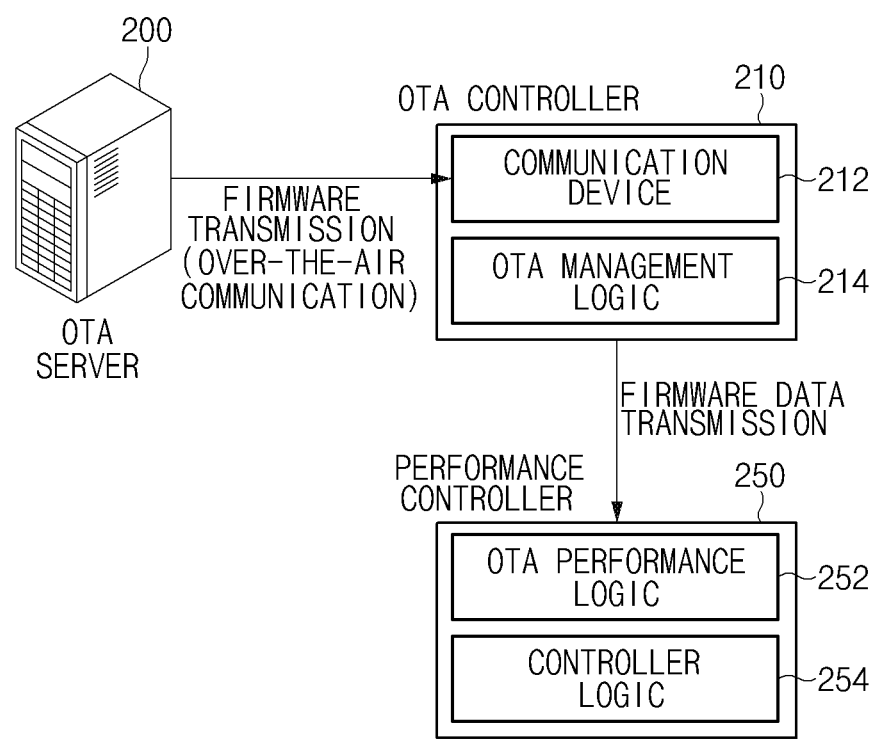
FIG. 2 is a diagram describing a structure of an over-the-air update system in a vehicle to which the present disclosure is applied.

FIG. 2 is a diagram describing a structure of an over-the-air update system in a vehicle to which the present disclosure is applied. Referring to FIG. 2, an over-the-air update apparatus of the vehicle may include an OTA controller 210 and an performance controller 250. The over-the-air (OTA) update of a controller applied to the present disclosure is a form in which the OTA controller 210 may be configured to wirelessly receive firmware from the server and update the received firmware to the Performance controller 250. A procedure may be divided into a wireless download (server-→the OTA controller 210) and a controller update (the OTA controller 210→Performance controller 250).

The OTA controller 210 may be configured to download firmware data from an OTA server 200 as a controller that mainly manages the OTA update, and transmit the firmware data to the Performance controller 250 to execute reprogramming. The OTA controller 210 may include a communication device 212, OTA management logic 214, a memory, and the like. In particular, the OTA management logic 214 may allow the OTA update to be performed by applying the default/the differential/the memory duplication methods for the reprogramming. The OTA management logic 214 may be configured to determine a network load rate and a firmware load rate to allow the update to be performed. In other words, the OTA management logic 214 may be configured to execute the operation of important OTA functions such as the update and the background transfer.

The Performance controller 250 may include OTA performance logic 252, controller logic 254, a memory, and the like, and may be configured to perform an update (write) operation based on an update request. The OTA performance logic 252 may be configured to perform the default/the differential/the memory duplication methods. The memory may be configured to store ROM data and updated data according to a corresponding function. In accordance with an example of the present disclosure, the OTA update system performing the firmware update will be described below in consideration of the current consumption and the processing speed for each controller.

Figure 3:
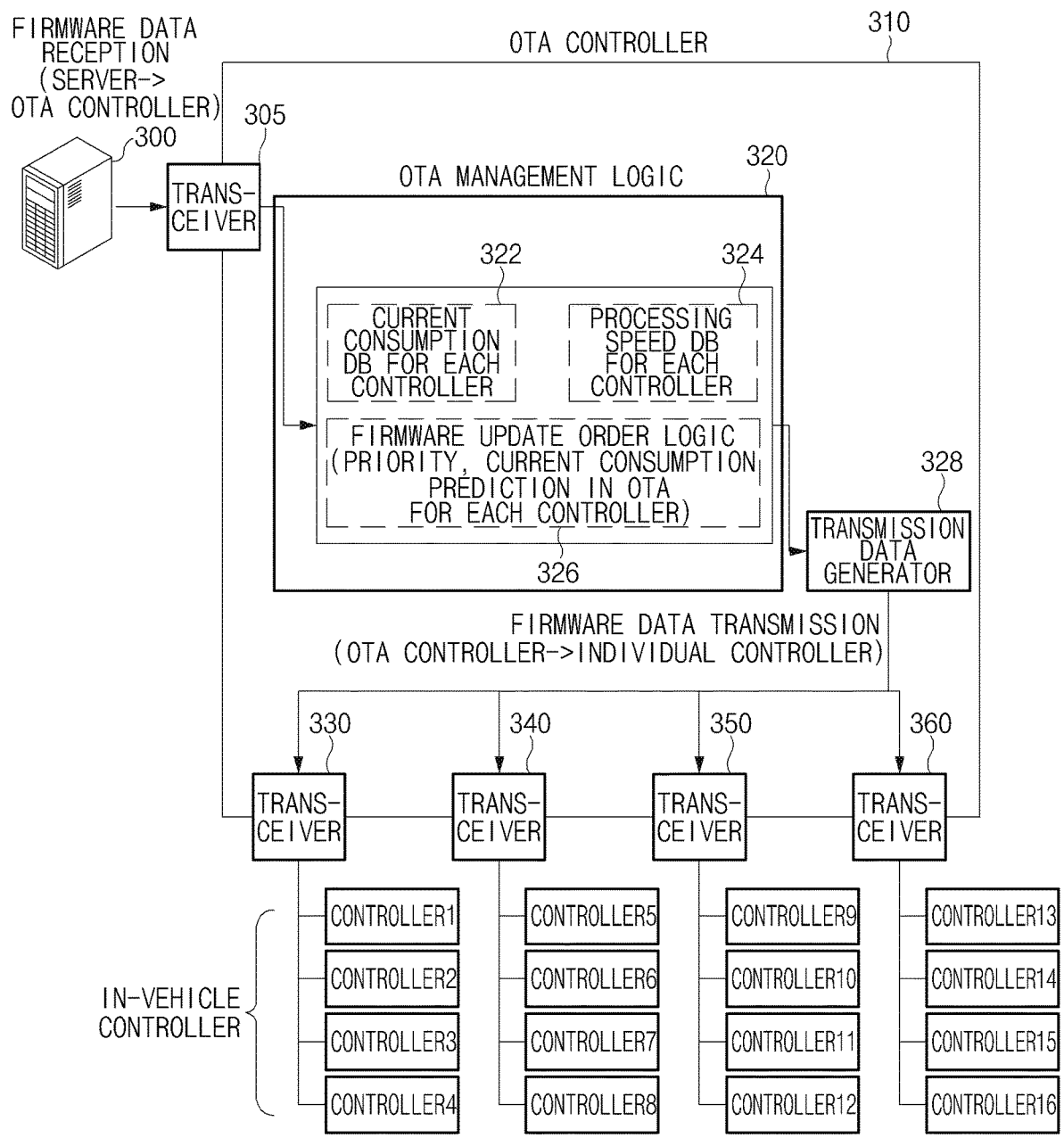
FIG. 3 is a diagram describing a structure of an over-the-air update system in a vehicle considering a priority according to an exemplary embodiment of the present disclosure.

FIG. 3 is a diagram describing a structure of an over-the-air update system in a vehicle considering a priority according to an exemplary embodiment of the present disclosure. Referring to FIG. 3, an OTA controller 310 may include OTA management logic 320. The OTA management logic 320 may be configured to identify the low power status of the vehicle battery, and allows the remote reprogramming of software of the vehicle controller to be executed in a low power state condition of the vehicle. In other words, the OTA management logic 320 may be configured to predict the consumption current for each controller during the OTA update, based on the current consumption for each controller and the data processing speed, and may allow the OTA update to be executed by determining the priority such that the optimized OTA update may be performed based on the limited battery status/amount when the OTA is performed.

In particular, the OTA management logic 320 may include a current consumption DB 322 for each controller and a processing speed DB 324 for each controller for the optimization of current consumption. The current consumption DB 322 for each controller and the processing speed DB 324 for each controller may be separately stored and managed in different memory types, or may be provided and stored in the form of a table or a mapping list corresponding to each controller on the entire memory. The current consumption DB 322 for each controller and the processing speed DB 324 for each controller may be stored/managed/updated with different values based on performance or updated version information of each controller that is actually provided in the vehicle.

The OTA management logic 320 may include firmware update order logic 326. The firmware update order logic 326 may be configured to predict the current consumption for each controller, based on the amount of OTA update data and the processing speed for each controller to execute the firmware update based on the priority. In other words, firmware transmission data may be selectively managed based on the priority. The firmware update based on the priority may be selectively applied based on the battery condition and an update stability in the vehicle. For example, in response to confirming that the battery is in a low power status, when a State of Charge (SOC) is less than 75%, the firmware update based on the priority may be performed in consideration of the battery status.

Accordingly, the OTA management logic 320 allows transmission data to which the priority is applied to be transmitted to the controller in the vehicle, based on the determination of the firmware update order logic 326 during the remote programming. The transmission data that are passed through a transmission data generator 328 may be transmitted to each controller in the vehicle through transceivers 330, 340, 350, and 360.

Figure 4:
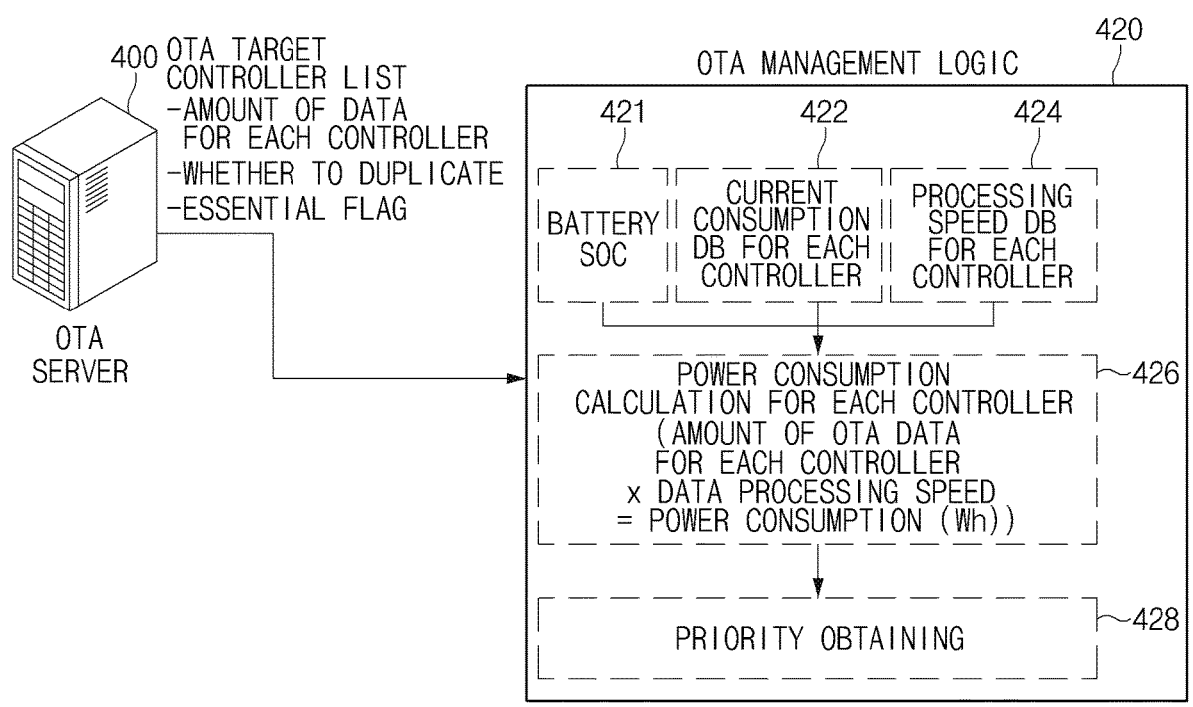
FIG. 4 is a diagram schematically illustrating a concept of deriving a priority according to an exemplary embodiment of the present disclosure.

FIG. 4 is a diagram schematically illustrating a concept of deriving a priority according to an exemplary embodiment of the present disclosure. Referring to FIG. 4, OTA management logic 420 according to the present disclosure predicts the current consumption for each controller when the OTA update is performed in the remote reprogramming of vehicle controller software under a low battery power condition, based on the current consumption and the data processing speed for each controller. Through this, the priority may be determined such that the optimized OTA update is performed based on the limited battery capacity when the OTA update is performed.

In particular, the OTA management logic 420 may be configured to receive a battery SOC value from a battery sensor to determine a low battery power (421). The OTA management logic 420 may be configured to calculate the power consumption for each controller by synthesizing a current consumption DB 422 for each controller and a processing speed DB 424 for each controller (426). The OTA management logic 420 may be configured to receive and manage the OTA target controller list from an OTA server 400. The OTA target controller list may be a form that further includes information regarding the amount of data for each controller, whether to duplicate for each controller, and essential flag information. Therefore, when the OTA target controller list and data are received from the OTA server 400, the OTA management logic 420 may be configured to determine the priority in data transmission by identifying the amount of data for each controller and the essential flag information, In particular, the data transmission of the controller that includes the essential flag information may be applied to the OTA update preferentially. The priority may be derived based on the current consumption among controllers including the essential flag information. Table 1 below illustrates the power consumption and the data processing speed for each controller according to an example of the present disclosure.

TABLE 1

| | | Basic Information | | Situation #1 | | | Situation #2 | | |
|---|---|---|---|---|---|---|---|---|---|
| Division | | Consumption | Data processing speed | Amount of data | Power Consumption | Priority | Amount of data | Power Consumption | Priority |
| Target to Duplication | Controller A | | | | | 0 | | | 0 |
| Non-target to Duplication | Controller B | 1 A | 1 M/S | 10M | 100/3600 Wh | 2 | 20M | 200/3600 Wh | 3 |
| | Controller C | 0.2 A | 1 M/S | 20M | 40/3600 Wh | 1 | 20M | 40/3600 Wh | 2 |
| | Controller D | 2 A | 2 M/S | 30M | 300/3600 Wh | 3 | 1M | 10/3600 Wh | 1 |

Referring to Table 1, a download and update order, in situation #1, may be determined as controller A→controller C→controller B→controller D, and in situation #2, may be determined as controller A→controller D→controller C→controller B.

As described above, the OTA management logic 420 may be configured to determine battery status information of the vehicle, and in response to determining that the battery status is low power, the OTA management logic 420 may be configured to execute the OTA update based on information regarding the amount of data for each controller, whether to duplicate for each controller, and the essential flag information. Alternatively, the OTA management logic 420 may be configured to execute the OTA update by calculating the power consumption for each controller and apply the priority in the order in which the current consumption value is small.

Figure 5:
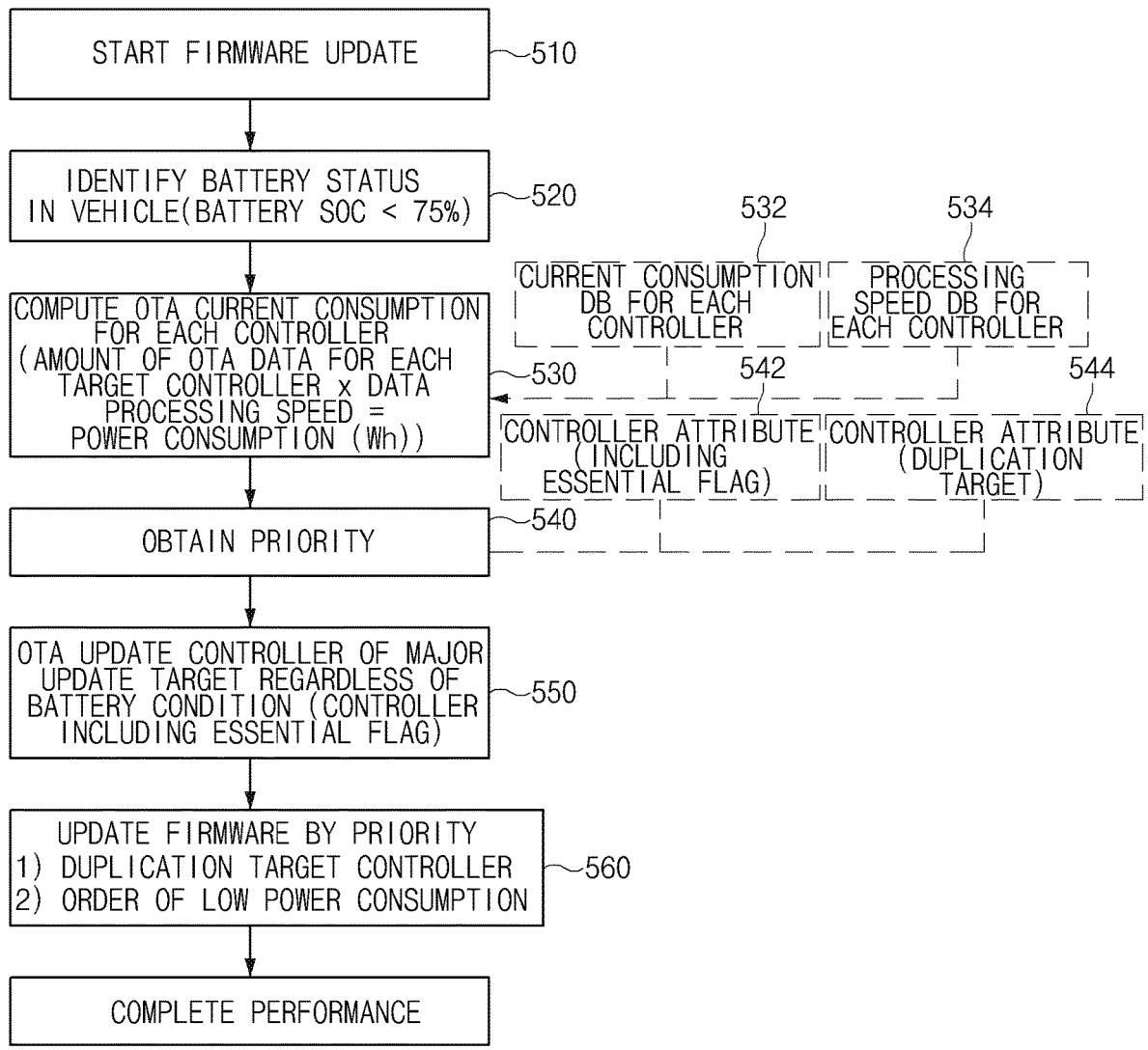
FIG. 5 is a flowchart illustrating a procedure for performing an update depending on a priority according to an exemplary embodiment of the present disclosure.

FIG. 5 is a diagram illustrating a procedure for performing an update based on a priority during an over-the-air update of a vehicle, according to an exemplary embodiment of the present disclosure. Referring to FIG. 5, when a processor detects a firmware update start (510), the processor may be configured to determine the battery status of the vehicle (520). The battery status may be determined to identify a stability of the firmware update and an optimization of a required time to perform the firmware update. Accordingly, the processor may be configured to determine whether the battery state is a low power state. In particular, the processor may be configured to determine the battery status, based on the state of charge (SOC) value detected/identified from the battery sensor (Battery Management system: BMS). In the present disclosure, as an example, it will be described to identify whether the battery SOC in the low power state of the vehicle is less than a preset value (e.g., about 75%). The battery state may be defined with different setting values based on an update performance, a communication situation, or a system safety. In particular, the battery state may be defined as an experimental value that ensures the update performance of each controller and each preset unique setting value.

Meanwhile, the battery sensor according to an example of the present disclosure may be configured to calculate the state of charge of a high voltage battery and provide the calculated result to the processor. For example, the battery sensor may be configured to notify the processor to limit charging when the state of charge is greater than or equal to a preset value (e.g., 80%), and to limit discharging when the state of charge is less than the preset value (e.g., 20%). In addition, the processor may allow the state of charge to be maintained in a preset range (e.g., about 55% to 75%) such that the high voltage battery may obtain an optimum efficiency. The preset upper limit value and minimum value, and the range may be changed and set to an optimum value based on an experimental value and a corresponding model.

In response to determining that the state of the battery is the low power state, the processor may be configured to calculate an OTA update current consumption for each controller (530). The processor may be configured to calculate the power consumption by identifying the current consumption for each controller and the processing speed. In other words, the processor calculates the power consumption for each controller by calculating the processing speed for the amount of OTA update data for each target controller.

In particular, the processor may be configured to determine the priority for performing the update based on each controller attribute (540). The priority may be determined by considering the essential flag information for each controller or a target of duplication. More specifically, the processor may be configured to selectively determine a major update target regardless of the battery status. In particular, the processor may be configured to determine a controller including the essential flag as the controller for performing the OTA update with the highest priority (550).

Accordingly, the processor may be configured to perform the firmware update per the priority based on the determined priority (560). In particular, the priority of the firmware update is in the order of the controller including the essential flag, the controller that is a target of duplicate, and the controller that is not a target of duplicate. Since the controller to be duplication performs a memory swap, it takes less time. Accordingly, the processor may be configured to perform the firmware update for each priority based on the essential flag information, whether to duplicate, or an order in which the power consumption is small. In other words, the controller including the essential flag may be preferentially updated for the first time regardless of the battery status.

When there are a plurality of controllers including the essential flag information, the processor may allow the update to be performed from a controller having a small current consumption.

As described above, according to an example of the present disclosure, by allowing the processor to perform the firmware update from a controller with a low current consumption, it is described that the firmware update of as many controllers as possible may be performed in a low power state, but the present disclosure is not limited thereto. The update for the selected controller may also be changed to the form that is performed first, based on a vehicle stability and user's service request.

Hereinafter, the present disclosure will describe four types of OTA update performing technology as an example, but it may be possible to perform a combined form of the OTA update for each technology based on different situations. Each technology has advantages and disadvantages, and for this purpose, reprogram master logic according to the present disclosure may select an appropriate technology for each OTA update target controller based on the vehicle safety and the system efficiency, and may be configured to execute the OTA update. In other words, the processor may be configured to determine a reprogramming method of each OTA update target controller when performing the reprogram. In particular, the processor may be configured to determine whether the preset condition is satisfied such that the vehicle may start the OTA update in a safe state and allows the OTA update to be performed.

Particularly, based on the ROM+method for each controller, the ROM and OTA method for each controller may be stored. When the reprogramming, a ROM transmission may be performed by using different sequence/diagnosis instructions for each OTA method for each controller. In other words, when the software is updated, by considering one method function of the default (normal)/differential/memory duplication/differential+memory duplication, distinct update may be performed. The method function may be configured in a form in which the OTA target controller for each technology is added/reduced based on the user service environment and the provision of an electronic controller, or based on a software update version and the like.

Hereinafter, an update operation of the default (normal)/differential/memory duplication/differential+memory duplication function according to an example of the present disclosure will be described. In the present disclosure, instructions and sequences of individual functions are described for ease of explanation, but instructions and sequences in a combined form may be proposed according to functions in a combined form as necessary. Accordingly, the present disclosure should not be interpreted in a restricted or limited form according to each function described.

Figure 6:
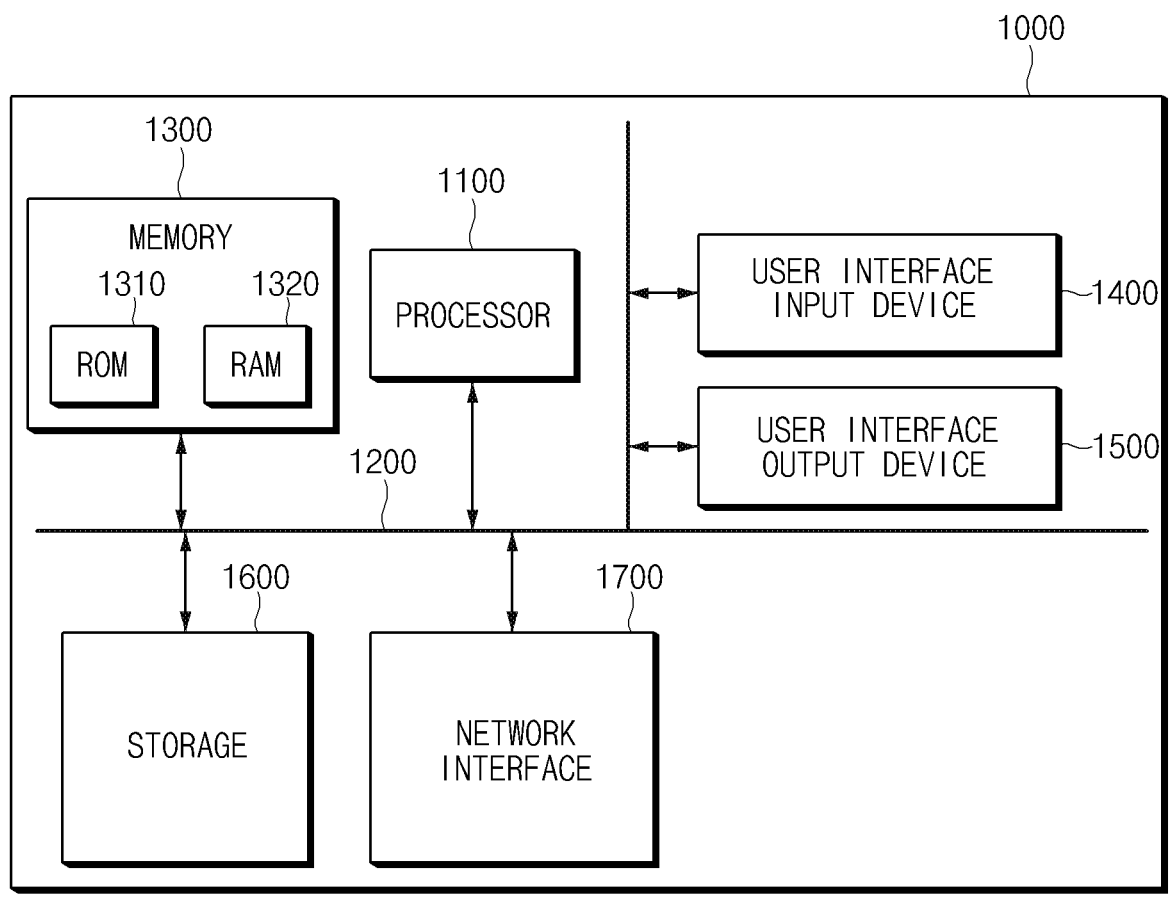
FIG. 6 is a diagram illustrating a computing system according to an exemplary embodiment of the present disclosure.

FIG. 6 is a diagram illustrating a computing system according to an exemplary embodiment of the present disclosure. Referring to FIG. 6, a computing system 1000 may include at least one processor 1100, a memory 1300, a user interface input device 1400, a user interface output device 1500, storage 1600, and a network interface 1700, which are connected through a bus 1200.

The processor 1100 may be a central processing unit (CPU) or a semiconductor device that executes instructions stored in the memory 1300 and/or the storage 1600. The memory 1300 and the storage 1600 may include various types of volatile or nonvolatile storage media. For example, the memory 1300 may include a read only memory (ROM) and the random access memory (RAM). Accordingly, steps of a method or algorithm described in connection with the exemplary embodiments disclosed herein may be implemented directly in hardware, software modules, or a combination of the two, that are executed by the processor 1100. The software module may reside in storage media (i.e., memory 1300 and/or storage 1600) such as a RAM, a flash memory, a ROM, an EPROM, an EEPROM, a register, a hard disk, a removable disk, or a CD-ROM.

An exemplary storage medium may be coupled to the processor 1100, and the processor 1100 may read information from the storage medium and may write information to the storage medium. Alternatively, the storage medium may be integral with the processor 1100. The processor and the storage medium may reside within an application specific integrated circuit (ASIC). The ASIC may reside in a user terminal. Alternatively, the processor and storage medium may reside as separate components within the user terminal.

As set forth above, the present disclosure allows more stable update to be performed in consideration of an amount of data to be updated, a processing speed, and the power consumption to perform a software update. In addition, as each controller performs an update based on a priority, that is, as each controller selectively applies an update based on the priority, the present disclosure provides an advantage of maintaining the stability and security of a system.

Accordingly, more efficiently by providing the user with service stability and an operation of a system depending on the priority, the present disclosure ensures as much as possible an improvement of a vehicle's merchandise. In addition, various effects may be provided that are directly or indirectly understood through the present disclosure.

The above description is merely illustrative of the spirit of the present disclosure, and those skilled in the art to which the present disclosure pertains may make various modifications and variations without departing from the spirit and scope of the present disclosure. Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An over-the-air update apparatus in a vehicle, comprising:
   a communication device configured to receive data for an over-the-air (OTA) update of vehicle software from an external server; and
   a processor configured to determine a battery status of the vehicle based on a battery SOC (state of charge) detected from a battery sensor, to determine a priority for the over-the-air update based on a current consumption and a data processing speed with respect to each of a plurality of controllers in response to determining that the battery status is a low power status, and to allow the data to be selectively transmitted based on the determined priority,
   wherein the processor is configured to determine whether each controller is a target of duplicate, and determine the priority such that the priority for the over-the-air update is high in an order of a controller that is a target of duplicate than a controller that is not a target of duplicate, and
   wherein the battery SOC in the low power state of the vehicle is less than a preset value wherein the processor is configured to calculate a power consumption for each controller by calculating a processing speed for an amount of OTA update data for each target controller.

2. The over-the-air update apparatus of claim 1, wherein the processor is configured to predict the current consumption with respect to each controller for the over-the-air update based on the current consumption and the data processing speed with respect to each controller.

3. The over-the-air update apparatus of claim 2, wherein the processor is configured to predict the current consumption with respect to each controller for the over-the-air update based on information about an amount of data with respect to the each controller.

4. The over-the-air update apparatus of claim 3, wherein the processor is configured to determine the current consumption with respect to each controller, and determine the priority such that the priority for the over-the-air update is high in an order of a controller having a small current consumption.

5. The over-the-air update apparatus of claim 1, wherein the processor is configured to determine the priority for the over-the-air update based on at least one of information regarding an amount of data, or information regarding essential flags with respect to each controller.

6. The over-the-air update apparatus of claim 5, wherein the processor is configured to determine the information regarding the essential flags with respect to the each controller, and determine the priority such that the priority for the over-the-air update is high in an order of a controller including the information about the essential flags.

7. The over-the-air update apparatus of claim 1, wherein the over-the-air update apparatus in the vehicle includes:
   an over-the-air (OTA) controller including OTA management logic including a communication device configured to wirelessly download the data from the server, and a processor configured to allow the data to be selectively transmitted based on the determined priority; and
   a performance controller including OTA performance logic configured to perform a firmware update by receiving data selectively transmitted from the OTA controller, and
   wherein the performance controller includes a transceiver and is configured to receive the data that is selectively transmitted.

8. The over-the-air update apparatus of claim 7, wherein the communication device includes at least one of a mobile communication unit, a broadcast communication unit, a short-range communication unit, or a Wi-Fi communication unit for the over-the-air update, and wherein the mobile communication unit supports at least one of a 3G system, an LTE system, a 5G system, or an NR (New Radio) system.

9. An over-the-air update method in a vehicle, comprising:
   receiving, by a processor, data for an over-the-air (OTA) update of vehicle software from an external server;
   determining, by the processor, a battery status of the vehicle based on a battery SOC (state of charge) detected from a battery sensor;
   determining, by the processor, a priority for the over-the-air update based on a current consumption and a data processing speed with respect to each of a plurality of controllers in response to determining that the battery status of the vehicle is a low power status; and
   allowing, by the processor, the data to be selectively transmitted based on the determined priority, wherein the determining of the priority includes:
- determining, by the processor, whether each controller is a target of duplicate, and
- determining, by the processor, the priority such that the priority for the over-the-air update is high in an order of a controller that is a target of duplicate than a controller that is not a target of duplicate,
- wherein the battery SOC in the low power state of the vehicle is less than a preset value, and
- wherein the determining of the priority includes calculating a power consumption for each controller by calculating a processing speed for an amount of OTA update data for each target controller.

10. The method of claim 9, wherein the determining of the priority includes:
- predicting, by the processor, the current consumption with respect to each controller for the over-the-air update based on the current consumption and the data processing speed with respect to the each controller.

11. The method of claim 10, wherein the determining of the priority includes:
- predicting, by the processor, the current consumption with respect to each controller for the over-the-air update based on information regarding an amount of data with respect to the each controller.

12. The method of claim 11, wherein the determining of the priority includes:
- determining, by the processor, the current consumption with respect to each controller, and
- determining, by the processor, the priority such that the priority for the over-the-air update is high in an order of a controller having a small current consumption.

13. The method of claim 9, wherein the determining of the priority includes:
- determining, by the processor, the priority for the over-the-air update based on at least one of information regarding an amount of data, or information regarding essential flags with respect to the each controller.

14. The method of claim 13, wherein the determining of the priority includes:
- determining, by the processor, the information regarding the essential flags with respect to each controller, and
- determining, by the processor, the priority such that the priority for the over-the-air update is high in an order of a controller including the information regarding the essential flags.

15. The method of claim 9, further comprising:
- wirelessly downloading, by the processor, the data from the server;
- allowing, by the processor, the data to be selectively transmitted based on the determined priority; and
- receiving, by the processor, the selectively transmitted data to perform a firmware update.

16. The method of claim 15, wherein the wirelessly downloading is performed through at least one of a mobile communication unit, a broadcast communication unit, a short-range communication unit, or a Wi-Fi communication unit, and wherein the mobile communication unit supports at least one of a 3G system, an LTE system, a 5G system, or an NR (New Radio) system.

* * * * *